United States Patent [19]

Kitazawa et al.

[11] Patent Number: 5,231,125
[45] Date of Patent: Jul. 27, 1993

[54] METHOD OF PREPARATION OF VINYL CHLORIDE RESIN PLASTISOL

[75] Inventors: Kouitu Kitazawa; Kouichi Ohrui, both of Kawasaki, Japan

[73] Assignee: Nippon Zeon Co., Ltd., Tokyo, Japan

[21] Appl. No.: 953,614

[22] Filed: Sep. 30, 1992

[30] Foreign Application Priority Data

Sep. 30, 1991 [JP] Japan .................................. 3-278284

[51] Int. Cl.⁵ .......................... C08K 5/10; C08K 5/11; C08K 5/12
[52] U.S. Cl. .................................. 524/296; 524/297; 524/298; 524/314
[58] Field of Search ................ 524/296, 297, 298, 314

[56] References Cited

U.S. PATENT DOCUMENTS 3,725,325  4/1973  Takeda et al. ...................... 524/296
3,795,649  3/1979  May ...................................... 526/296

FOREIGN PATENT DOCUMENTS 0006008  1/1988  Japan .................................. 524/297

OTHER PUBLICATIONS

Japanese Patent Laid Open No. Tokkaisho 60-120726 (JP 60120726) (abstract only).
Japanese Patent Laid Open No. Tokkaisho 64-31605 (JP 1031605) (abstract only).
Japanese Patent Public No. Tokkohei 1-42282 (JP 89042282).

Primary Examiner—Paul R. Michl
Assistant Examiner—Peter Szekely
Attorney, Agent, or Firm—Millen, White, Zelano & Branigan

[57] ABSTRACT

A vinyl chloride resin plastisol can be prepared without the shearing action mixing conventionally required for mixing a resin and plasticizer, merely by immersing in a conventional plasticizer, aggregates in the form of a dry power and having an average diameter of 80 to 700 μm of vinyl chloride resin particles; using a spray drying apparatus to form aggregates having an average diameter in the range from 80 to 700 μm or by adding an organic fluid which is barely soluble in water and does not dissolve or swell the vinyl chloride resin to the aqueous dispersion of the vinyl chloride particles, followed by drying the aggregates thus formed at a temperature of 70° C. or below.

20 Claims, No Drawings

METHOD OF PREPARATION OF VINYL CHLORIDE RESIN PLASTISOL

BACKGROUND OF THE INVENTION

1. Field of the Invention

The present invention relates to a novel method of preparing a vinyl chloride resin plastisol easily. More particularly, it relates to a method of preparing a plastisol merely by the act of immersing aggregates of vinyl chloride resin particles adapted for paste processing in a plasticizer.

2. Description of the Prior Art

For the paste processing of a vinyl chloride resin, a fine particulate vinyl chloride resin prepared for the paste processing is mixed with a plasticizer and a stabilizer and, when necessary, with pigments, fillers and other compounding ingredients to prepare a liquid plastisol and the plastisol thus prepared is used for molding such as casting, coating dipping and the like.

In the technique of paste processing of vinyl chloride resins, it is very important for providing molded articles having excellent appearance with delicate fine surface structures and prevent decreased mechanical strengths in the molded articles, that the major part of the vinyl chloride resin is dispersed in the plasticizer in a condition such that the particles are divided almost to the size of the primary particles.

It is generally required that the vinyl chloride resin used for paste processing is in the form of fine particles of spherical shape having the primary diameter of 0.1 to 5 $\mu$m. The vinyl chloride resin for the paste processing is generally prepared by preparing a polymer latex by emulsion polymerization or by microsuspension polymerization, then, making from the polymer thus prepared a powder containing aggregates of the primary particles in spray drops by spray drying and, finally, pulverizing the aggregates by a pulverizer.

For preparation of the paste using the vinyl chloride resin thus prepared, the vinyl chloride resin particles are mixed with a plasticizer in a mixer, such as a crushing mixer, a Henshel mixer, a biaxial mixer and the like. In the mixing, it is required that the major part of the resin particles is divided to the size of the primary particles, or that, if this condition is difficult to achieve, the aggregates obtained after the pulverizing described above are not further aggregated to form larger particles.

However, the individual particles in the aggregates formed by spray drying of the latex are bound together firmly and are not easily pulverized to the size of the primary particles by the pulverizing operation by a pulverizer. Thus, the powder produced after the pulverizing actually is a mixture containing fragments of the aggregates having various sizes.

Two things must be considered for the dispersion of the resin particles in the preparation of a plastisol. The first of them is that the aggregates must be dispersed by decomposing at least to the size of the pulverized particles described above because the aggregates of the resin particles behave as a combined block of particles in the plasticizer. The second of them is that larger fragments of the aggregates still remaining when the major part is dispersed by decomposing to the size of the pulverized particles must be demolished for dispersion by the shearing force of a mixing step.

When these things are considered, an onerous process is conventionally required for achieving good dispersion of particles which employs a powerful mixing apparatus and only a limited amount of plasticizer is used for dispersion at first so that the shearing force of the mixer works efficiently on a rather solid mixture before the remaining plasticizer is added.

In conventional methods, the size of the droplets in the drying process is made smaller for more efficient drying of the powder and for adapting to the application of the paste described above. Thus, particles of the average diameter of 60 $\mu$m or less are formed in the drying process and the dried particles are then pulverized by a pulverizer to produce particles having an average diameter of 10 to 20 $\mu$m.

In plastisols prepared using particles without the pulverizing process or prepared by merely immersing the particles pulverized by the pulverizing process in the plasticizer, the particles behave like combined blocks of many particles having diameters of 1 mm or more. In these plastisols, the plasticizer does not penetrate into the inside of the blocks of the particles even though the outer surface of the blocks are wet with the plasticizer. Plastisols having a heterogeneous condition of this kind cannot be advantageously utilized for various kinds of processing.

SUMMARY OF THE INVENTION

The present invention accordingly has an object to provide methods of easily preparing vinyl chloride resin plastisol comprising finely dispersed vinyl chloride resin particles from aggregates of the particles without using a special apparatus.

Extensive investigations undertaken by the present inventors with the object described above lead to a discovery that a good plastisol comprising finely dispersed resin particles can be obtained easily without using a special deaggregating mixing apparatus or a special process step merely by immersing in a plasticizer a polymer powder having a larger average diameter than the aggregate prepared without a pulverizing operation by a pulverizer. The secondary particle, viz., the aggregate, is a particle formed after the spray drying of the primary particle which is formed in the polymerization. This discovery is based on the assumption that a heterogenous mixture containing particles having diameters of 1 mm or more is formed because the smaller diameter of the secondary particle makes the aggregating force between the particles stronger. The first aspect of the present invention has been completed on the basis of this discovery.

It was also discovered that aggregates of the particles do not remain when the resin is recovered after addition of a specific kind of solvent to the aqueous dispersion of vinyl chloride resin and a good plastisol having finely dispersed resin particles can be obtained easily without using a special deaggregating apparatus or process. The second aspect of the present invention has been completed on the basis of this discovery.

The present invention comprises the following two methods.

(1) A method of preparation of vinyl chloride resin plastisol comprising dispersing vinyl chloride resin particles in a plasticizer merely by immersing in 30 to 250 weight parts of the plasticizer 100 weight parts of the vinyl chloride resin particles prepared by drying an aqueous dispersion of the vinyl chloride resin using a spray drying apparatus to form particles having an average diameter in the range from 80 to 700 $\mu$m.

(2) A method of preparation of vinyl chloride resin plastisol comprising forming aggregates of the vinyl chloride resin particles comprising an organic fluid and a vinyl chloride resin by adding 0.5 to 15 weight parts of an organic fluid which is barely soluble in water and does not dissolve or swell the vinyl chloride resin to an aqueous dispersion of the vinyl chloride resin containing 100 weight parts of the vinyl chloride resin, dewatering the aggregates, drying the aggregates at a temperature of 70° C. or below to prepare aggregate particles comprising the organic fluid and the vinyl chloride resin and dispersing the aggregate particles in a plasticizer by merely immersing the aggregate particles containing 100 weight parts of the vinyl chloride resin in 30 to 250 weight parts of the plasticizer.

Other and further objects, features and advantages of the invention will appear more fully from the following description.

DETAILED DESCRIPTION OF THE INVENTION

The vinyl chloride resin of the invention is a particulate polymer prepared from vinyl chloride or a mixture thereof with copolymerizable vinyl compounds by emulsion polymerization, seeding emulsion polymerization or microsuspension polymerization.

The type of the copolymerizable vinyl compound employed is not particularly limited but any compound radical copolymerizable with vinyl chloride may be utilized. Examples of the copolymerizable vinyl monomers are: vinyl esters, such as vinyl acetate, vinyl propionate, vinyl myristate, vinyl oleate, vinyl benzoate and the like; unsaturated carboxylic acids, such as acrylic acid, methacrylic acid, maleic acid, fumaric acid, cinnamic acid and the like; anhydrides of the unsaturated carboxylic acids described above; esters of acrylic acid, such as methyl acrylate, ethyl acrylate, butyl acrylate, octyl acrylate, benzyl acrylate and the like; esters of methacrylic acid, such as methyl methacrylate, ethyl methacrylate, butyl methacrylate, octyl methacrylate, benzyl methacrylate and the like; esters of unsaturated carboxylic acids, such as esters of maleic acid, esters of fumaric acid, esters of succinic acid and the like; vinyl ethers, such as methyl vinyl ether, ethyl vinyl ether, butyl vinyl ether, octyl vinyl ether, myristyl vinyl ether and the like; monoolefins, such as ethylene, propylene, butene, pentene and the like; vinylidene chloride; styrene and derivatives thereof; acrylonitrile; methacrylonitrile and the like others. The copolymerizable vinyl compounds may be utilized singly or as a combination of two or more kinds. The content of vinyl chloride in the copolymer is generally 50 weight % or more.

When an aqueous dispersion of the vinyl chloride resin is dried by spray drying, primary particles of the resin in droplets combine together while water in the droplet is decreased by vaporization to form aggregates of spherical shapes when the water is removed. The diameter of the aggregate depends on the diameter of the droplet. The diameter of the droplet can be controlled by the diameter of holes in the disk and the speed of rotation when a rotating disk spray drying apparatus is used and by the diameter of the nozzles and the pressure of liquid supply when a nozzle spray drying apparatus is used. The diameter of the droplet can also be controlled by the concentration and the viscosity of the aqueous dispersion.

In method (1) of the invention, the average diameter of the dried resin aggregates particles is in the range from 80 to 700 $\mu$m. When the average diameter is smaller than 80 $\mu$m, the aggregates particles are strongly bound together so that when they are immersed in a plasticizer a large amount of heterogeneous aggregates of the particles having diameter of 1 mm or more is formed. Thus, a good plastisol is not formed in this condition. When the average diameter is larger than 700 $\mu$m, the efficiency of the drying process is decreased and the condition is not advantageous for industrial practice.

The average diameter of the dried aggregate particles is preferably in the range from 100 to 300 $\mu$m. The average diameter was measured by the following method: to 350 g of vinyl chloride resin particles, 50 mg of carbon black was added as an anitstatic agent; the mixture was screened under vibration by using the standard screen according to Japanese Industrial Standard; and the diameter of 50 weight % of the original weight was obtained as the desired average diameter.

The droplets produced in the spray drying in method (1) of the invention is larger than those in the conventional methods. To achieve the complete drying, other drying processes, such as fluidized drying, air stream drying, rotation drying and the like, as described in Laid Open Japanese Patent Application Show a 60-120726, may be utilized in combination with the spray drying.

In method (1) of the invention, the strong pulverizing process which is generally practiced after the drying process is not necessary. However, the conventional operation of removing larger particles by screening using a screen of a suitable fineness may be employed according to necessity. Weakly bound aggregates having larger sizes are not only separated by the screening operation but also are pulverized to smaller particles having suitable sizes in the screening process.

The temperature of the spray drying is not particularly limited. When the temperature of drying such as the temperature of hot air at the inlet of the drying process is set at a low temperature like 110° to 140° C., the resin particles in the droplets are not bound together because the temperature of the resin particles during the constant rate drying period can be considered to be the same as the wet bulb temperature of the hot air at the inlet. The resin particles are bound together only with weak forces during this period. When the temperature of the hot air at the inlet of the drying process is set at a high temperature like 160° to 180° C., the resin particles in the droplets are bound together by partial melting while water in the droplets is vaporized. Thus, aggregates in which the resin particles are bound strongly to each other are formed. On the other hand, the temperature of the resin during the decreasing rate drying period approaches the temperature of the surrounding dry air. When the temperature at the outlet of the drying process is set at a low temperature like 40° to 55° C., the resin particles are not bound together during this period. When the temperature at the outlet of the drying process is set at a higher temperature like 70° C. or more, the resin particles are bound together by melting during this period to form strongly bound aggregates. When the weakly bound aggregates of resin particles having an average diameter of 80 $\mu$m to 1 mm is immersed into a plasticizer, the plastisol thus obtained contains resin particles produced by deaggregating the aggregates to the size of the primary particles. The plastisol thus prepared can be utilized for particular applications in which even a slight protrusion at the coating surface caused by aggregates of resin particles is unacceptable because of the unsightly appearance.

When strongly bound aggregates having an average diameter of 80 to 700 μm is immersed in a plasticizer, most of the aggregates are demolished (deaggregated) to form a plastisol. However, a portion of the aggregates remains. This kind of plastisol is therefore utilized for articles molded by casting or by foaming, in which the presence of the larger aggregates does not affect the appearance of the product.

In the method (1) of the invention, the mixture may be gently stirred to promote pulverization and dispersion of the resin particles.

The method (2) of the invention utilizes the method of recovering vinyl chloride resins disclosed in Japanese Patent Publication Heisei 1-42282.

The method of recovering vinyl chloride resins comprises the following fundamental stages: (1) a first stage in which an aqueous dispersion of a resin and an organic fluid are mixed and the resin particles are bound together through the organic fluid; (2) a second stage in which the aqueous phase is removed from the mixture of the aqueous dispersion of the resin and the organic fluid; and (3) a third stage in which aggregates of the resin particles are prepared by dewatering and drying the mixture from which the aqueous part has been removed.

To the process described above, a fourth stage (4) may be added in which the resin is recovered from the aqueous phase separated in the second stage and the recovered resin is dried singly or in combination with the resin from which the aqueous part has been removed in the second stage described above.

The organic liquid added to the aqueous dispersion of the vinyl chloride resin for the purpose described above remains in the finally prepared plastisol. It is an organic liquid which does not dissolve or swell the vinyl chloride resin in the conditions of the separation and recovering processes of the invention. As the organic liquid of the invention, one having a melting point of 20° C. or lower and a boiling point at atmospheric pressure which is the same as or higher than the temperature employed in the separation and recovering processes of the resin, preferably 200° C. or higher, is utilized. If an organic fluid having a boiling point lower than the temperature in the separation and recovering processes of the resin is utilized, it is vaporized during the separation and recovering processes of the resin and apparatus for recovering it are required. Organic liquids of this type are not economically advantageous. When two or more kinds of organic liquids are utilized in combination, the mixture can satisfy the condition described above even when one the individual organic liquids does not.

Examples of the organic liquid utilized in the invention (2) are;
(1) Plasticizers of alkylesters of phthalic acid, such as dioctyl phthalate, dinonyl phthalate and the like;
(2) Plasticizers of esters of aromatic carboxylic acids, such as trioctyl trimellitate, diethyleneglycol dibenzoate and the like;
(3) Plasticizers of ester of aliphatic dibasic acids; such as dioctyl adipate, dibutyl sebacate and the like;
(4) Plasticizers of esters of phosphoric acid, such as trioctyl phosphate, trichloroethyl phosphate and the like;
(5) Plasticizers of glycol esters of aliphatic acids, such as diethylenglycol dicaprilate, 1,4-butyleneglycol di-2-ethylhexanoate and the like;
(6) Plasticizers of polyesters;
(7) Secondary plasticizers of esters of aliphatic acids, such as butyl oleate and the like, epoxides, such as epoxidized soy bean oil and the like, chlorinated paraffins, such as methyl esters of chlorinated fatty acids and the like, esters of aliphatic dibasic acids, such as dioctyl succinate, and the like others;
(8) Diluents derived from petroleum, such as mineral spirits, mineral terpene and the like, and long chain alkylbenzene diluents, such as dodecylbenzene and the like;
(9) Liquid lubricants, such as higher alcohols, liquid paraffin, alkyl esters of higher fatty acids and the like;
and other like organic fluids.

Preferable examples among these organic liquids are dioctyl phthalate, dinonyl phthalate and dioctyl adipate.

The amount of the organic liquid utilized in the invention is suitably selected in the range from 0.5 to 15 weight parts and preferably in the range from 3 to 10 weight parts based on 100 weight parts of the resin in the aqueous dispersion according to the concentration of the resin in the aqueous dispersion.

When the amount of the organic liquid is less than 0.5 weight parts, aggregates are not formed and, when the amount is more than 15 weight parts, the formation of the aggregates does not proceed smoothly during the mixing with the resin and the storage stability is decreased.

The organic liquid is mixed with the aqueous dispersion of the resin at a temperature in the range from 20° to 70° C. It is also required that the organic liquid does not dissolve or swell the resin at the mixing temperature. Because a higher temperature promotes dissolving and swelling of the resin by the organic fluid, mixing at temperature in the range from 20° to 50° C. is preferred.

The aqueous phase of the resin aggregates prepared by using the organic liquid is separated and removed by a conventional method suitable for the actual condition of the mixture formed. Examples of such conventional methods are centrifugal separation, inclining separation, screening and the like. The temperature of the separation process is in the range from 20° to 70° C. and preferably in the range from 20° to 50° C. to prevent softening and binding of the particles.

The aggregates of the resin particles separated during the separation process described above are immediately sent to the drying process and water attached to the particles are removed. The conditions employed in the drying process must be suitably selected so that the binding of the resin particles and the strength of the binding do not have damaging effect on the dispersion during the processing of the plate. The temperature of the aggregates of the resin particles is kept rather low during the drying process, Viz., 70° C. or lower and preferably 50° C. or lower. The exit temperature of the hot air used for the drying process is thus necessarily 70° C. or lower.

After the drying process, aggregates of the vinyl chloride resin particles in which the particles are bound together with a layer of the organic fluid between the particles are obtained. Because the primary particles in the aggregates are bound together through the layer of the organic fluid, the binding force between the primary particles is weak and the aggregates are dispersed into the smaller primary particles when they merely by being immersed in the plasticizer. Thus, a plastisol of high quality and good stability can be produced.

In method (2) of the invention, the mixture may be stirred mildly during the dispersion process described above for promoting the dispersion to fine particles.

The kind of the plasticizer utilized in methods (1) and (2) of the invention is not particularly limited and plasticizers generally utilized as the plasticizer in plastisols of vinyl chloride resins can be utilized. Examples of such plasticizer are: derivatives of phthalic acid, such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di(heptyl, nonyl, undecyl) phthalate, benzyl phthalate, butyl benzyl phthalate, dinonyl phthalate, dicyclohexyl phthalate and the like; derivatives of isophthalic acid, such as dimethyl isophthalate, di-(2-ethylhexyl) isophthalate, diisooctyl isophthalate and the like; derivatives of tetrahydrophthalic acid, such as di-(2-ethylhexyl) tetrahydrophthalate, di-n-octyl tetrahydrophthalate, diisodecyl tetrahydrophthalate and the like; derivatives of adipic acid, such as di-n-butyl adipate, di-(2-ethylhexyl) adipate, diisodecyl adipate, diisononyl adipate and the like; derivatives of azelaic acid, such as di-(2-ethylhexyl) azelate, diisooctyl azelate, di-n-hexyl azelate and the like; derivatives of sebacic acid, such as di-n-butyl sebacate, di-(2-ethylhexyl) sebacate and the like; derivatives of maleic acid, such as di-n-butyl maleate, dimethyl maleate, diethyl maleate, di-(2-ethylhexyl) maleate and the like; derivatives of fumaric acid, such as di-n-butyl fumarate, di-(2-ethylhexyl) fumarate and the like; derivatives of trimellitic acid, such as tri-(2-ethylhexyl) trimellitate, tri-n-octyl trimellitate, triisodecyl trimellitate, triisooctyl trimellitate, tri-n-hexyl trimellitate, triisononyl trimellitate and the like; derivatives of pyromellitic acid, such as tetra-(2-ethylhexyl) pyromellitate, tetra-n-octyl pyromellitate and the like; derivatives of citric acid, such as triethyl citrate, tri-n-butyl citrate, acetyl triethyl citrate, acetyl tri-(2-ethylhexyl) citrate and the like; derivatives of itaconic acid, such as monomethyl itaconate, monobutyl itaconate, dimethyl itaconate, diethyl itaconate, dibutyl itaconate, di-(2-ethylhexyl) itaconate and the like; derivatives of oleic acid, such as butyl oleate, glyceryl monooleate, diethyleneglycol monooleate and the like; derivatives of ricinoleic acid, such as methyl acetyl ricinolate, butyl acetyl ricinolate, glyceryl monoricinolate, diethyleneglycol monoricinolate and the like; derivatives of stearic acid, such as n-butyl stearate, glycerine monostearate, diethyleneglycol distearate and the like; derivatives of other fatty acids, such as diethyleneglycol monolaurate, diethyleneglycol diperalgonate, fatty acid esters of pentaerythritol and the like; derivatives of phosphoric acid, such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, tris-(chloroethyl) phosphate and the like; derivatives of glycols, such as diethyleneglycol dibenzoate, dipropyleneglycol dibenzoate, triethyleneglycol dibenzoate, triethyleneglycol di-(2-ethylbutyrate), triethyleneglycol di-(2-ethylhexoate), dibutyl methylenebis-thioglycolate and the like; derivatives of glycerol, such as glycerol monoacetate, glycerol triacetate, glycerol tributyrate and the like; epoxy derivatives, such as epoxidized soy bean oil, diisodecyl epoxyhexahydrophthalate, epoxytriglycerides, epoxidized octyl oleate, epoxidized decyl oleate and the like; polyester plasticizers, such as polyesters from adipic acid, polyesters from sebacic acid, polyesters from phthalic acid and the like; partially hydrogenated terphenyl; adhesive plasticizers and the like other plasticizers.

The plasticizer may be utilized singly or as a combination of two or more kinds. The amount of the plasticizer in the vinyl chloride resin plastisol as the final product is in the range from 30 to 250 weight parts, preferably in the range from 40 to 100 weight parts and more preferably in the range from 50 to 80 weight parts based on 100 weight parts of the vinyl chloride resin.

When the amount of the plasticizer is less than 30 weight parts, a problem arises in that a homogeneous plastisol cannot be obtained by immersing the aggregate particles in the plasticizer or can be obtained only after immersion for a long period of time. When the amount of the plasticizer is more than 250 weight parts, the plasticizer bleeds out at the surface of the molded articles.

In the method of a preparation of plastisol of the invention, other ingredients generally utilized for polyvinylchloride plastisols, such as stabilizers, ultraviolet absorbents, antioxidants, lubricants, fillers, pigments and the like, may be additionally utilized according to necessity so long as the object of the invention is not adversely affected.

For the preparation of the plastisol according to the method of the invention, the strong mixing generally required for mixing the resin and the plasticizer as the main components is not necessary. A finely dispersed plastisol can be obtained merely by charging the aggregate particles into a tank containing the plasticizer and leaving the mixture standing. It is also effective to immerse the vinyl chloride resin particles in the plasticizer with mild stirring. A mixing apparatus, such as a grinding mixer, a Henchel mixer or a biaxial mixer, is therefore not necessary. An apparatus comprising a tank alone or a tank and a simple stirrer used for immersion of the aggregate particles in the plasticizer is sufficient for the operation, rather than a powerful mixer with shearing action. Of course, this does not preclude using other apparatus, such as a ribbon mixer, a Hobart mixer and the like.

The time of immersion of the aggregate particles in the plasticizer required to convert them into an aggregate-free plastisol differs depending on the kind of the plasticizer utilized and may be suitably determined accordingly. When dioctyl phthalate is utilized as the plasticizer, for example, the time of immersion is generally 5 hours or more and preferably 10 hours or more. The upper limit to the time of the immersion is not necessarily made. However, when the time of the immersion is too long, the viscosity of the plastisol increases and it is preferred that the plastisol is used in its end use application before too long time passes after the immersion.

The vinyl chloride resin aggregate particles utilized for the preparation of the plastisol in the method of the invention have particularly excellent properties and their transportation by a tank lorry becomes possible. Bulk transportation of conventional vinyl chloride paste resin particles is difficult because of bridge formation in the tank and pipe clogging by the particles. Thus, according to the method of the invention, the vinyl chloride resin plastisol of the invention can be produced at any place where a simple apparatus for the dispersion of the dry aggregates in the plastisol can be found.

When the vinyl chloride resin aggregate particles and the plasticizer are charged simultaneously into the tank of a tank lorry, the immersion process may be made in the tank during the transportation to prepare the plastisol and the prepared plastisol can be served for application on arrival of the tank lorry at a user site. Although the plastisol can be prepared by merely adding the vinyl chloride resin particles to the plasticizer, it is preferable for better dispersion that a vehicle for transportation having a tank slowly rotating during the transportation, such as a concrete mixer car, is utilized. When the resin is supplied to the user in the form of a plastisol as described above, mixing equipment is not necessary at the site of the user and the operation time usually required for mixing can be eliminated. Thus, the industrial advantage of the method of the invention is remarkable.

DESCRIPTION OF THE PREFERRED EMBODIMENTS

The invention will be understood more readily with reference to the following examples; however, these examples are intended to illustrate the invention and are not to be construed to limit the scope of the invention.

EXAMPLE OF PREPARATION OF MATERIAL 1

A vinyl chloride resin latex for the paste processing prepared by microsuspension polymerization (containing 45 weight % of the resin and having an average diameter of the primary particles of 0.92 $\mu$m measured by the electronmicroscopy) is charged to a parallel flow spray drier equipped with a rotating disk sprayer (having a tower diameter of 2,000 mm and a tower length of 3,500 mm) and dried by rotating the disk at the speed of 9,000 rpm. Drying air having absolute humidity of 0.010 kgH$_2$O/kg was used at the temperature of the inlet of 125° C. and the temperature of the outlet of 50° C. The powder obtained contained 1.4 weight % of moisture and was further dried by passing air of 40° C. for 3 hours to the content of moisture of 0.1 weight %. The particles had an average diameter of 90 $\mu$m measured by the screening method.

COMPARATIVE EXAMPLE OF PREPARATION OF MATERIAL 1

A vinyl chloride resin latex for the paste processing was dried by the same method as in Example of preparation of material 1 except that the disk was rotated at the speed of 11,000 rpm. The powder obtained at the outlet of the spray drying contained 1.0 weight % of moisture and was further dried by passing air of 40° C. for 3 hours to the content of moisture of 0.1 weight %. The particles had an average diameter of 60 $\mu$m measured by the screening method.

COMPARATIVE EXAMPLE OF PREPARATION OF MATERIAL 2

A part of the particles obtained in Comparative example of preparation of material 1 was pulverized by a pulverizer and a resin powder having 0.2 weight % of moisture and an average diameter of 15 $\mu$m measured by the precipitation turbidity method was obtained.

EXAMPLE OF PREPARATION OF MATERIAL 2

A vinyl chloride resin latex for the paste processing was spray dried by the same method as in Example of preparation of material 1 except that the temperature of air at the inlet was 165° C. in place of 125° C. in Example of preparation of material 1. The powder obtained at the outlet of the spray drying contained 0.2 weight % of moisture and was not further dried. The particles had an average diameter of 88 $\mu$m measured by the screening method.

EXAMPLE OF PREPARATION OF MATERIAL 3

To a continuous mixer having an inner volume of 120 cc and equipped with a motor having an input power of 1.5 kw, an aqueous dispersion of a vinyl chloride latex for the paste processing prepared by seeding emulsion polymerization (containing 42 weight % of the resin and having two sharp peaks at 1.10 $\mu$m and 0.20 $\mu$m in the distribution of the diameter of the primary particles measured by the electron-microscopy) and dinonyl phthalate were charged at the flow rates of 0.70 liter/minute and 0.014 liter/minute, respectively, and the components were mixed at 25° C. to obtain a dispersion containing mixed aggregates. The dispersion was dewatered by a centrifuge and the wet cake obtained was dried in a heated air stream of 50° C. in a fluidized bed drier to obtain an aggregate particles composed of the organic fluid and the vinyl chloride resin.

The product had an average diameter of 190 $\mu$m measured by the screening method.

EXAMPLES 1 to 3

Aggregate particles or a resin powder prepared in one of Examples of preparation of material 1 to 3 in an amount corresponding to 200 weight parts of the resin in every case were added to a beaker containing 120 weight parts of a plasticizer and the aggregate particles or a resin powder was immersed into the plasticizer by mildly stirring with a spatula. The mixture was left standing for 24 hours and then evaluated. Results are shown in Table 1.

COMPARATIVE EXAMPLES 1 AND 2

Aggregate particles or a resin powder were immersed into a plasticizer and the mixture was evaluated by the same method as in Examples 1 to 3 except that the aggregate particles or a resin powder prepared in one of Comparative examples of preparation of material 1 and 2 were used in place of the aggregate particles or the resin powder prepared in one of Examples of preparation of material 1 to 3. Results are shown in Table 1.

TABLE 1

| plasticizer | Example 1 | | Example 2 | | Example 3 | | Comparative example 1 | | Comparative example 2 | |
| --- | --- | --- | --- | --- | --- | --- | --- | --- | --- | --- |
| | 1.0 mm screen ON (%) | grind gauge ($\mu$m) | 1.0 mm screen ON (%) | grind gauge ($\mu$m) | 1.0 mm screen ON (%) | grind gauge ($\mu$m) | 1.0 mm screen ON (%) | grind gauge ($\mu$m) | 1.0 mm screen ON (%) | grind gauge ($\mu$m) |
| dibutyl phthalate | 0 | 70 | 0 | 150 | 0 | 50 | 6.2 | 80 | 21.7 | 50 |
| dioctyl phthalate | 0 | 70 | 0 | 230 | 0 | 60 | 4.5 | 70 | 29.6 | 60 |
| dinonyl phthalate | 0 | 90 | 0 | 280 | 0 | 60 | 7.4 | 90 | 36.3 | 60 |
| dioctyl adipate | 0 | 90 | 0 | 270 | 0 | 60 | 4.8 | 90 | 33.1 | 60 |

The aggregate particles and resin powder were evaluated by the following methods.

Methods of Evaluation

1.0 mm screening test

A plastisol in an amount of 5 g was screened by a 1.0 mm screen and aggregates remained on the screen were washed with 50 ml of mineral spirit and then with 50 ml of methanol. The large aggregate particles remaining on the screen were then heated at 100° C. for 10 minutes and weighed. The ratio of the weight of the remaining aggregate particles to the weight of the resin added to the beaker was calculated.

When the ratio was 0, the plastisol had been prepared successfully and no particle having a diameter of 1 mm or larger was formed. When the ratio is larger than 0, particles having a diameter larger than 1 mm are formed and the preparation of the plastisol failed.

A Grind Gauge Test

A plastisol in an amount of 0.5 g was placed at the base line which is at the deepest position of a stainless gauge having a gutter with a tapered depth. The plastisol was extended to the direction of shallower depth with a coater. The largest size of the aggregates was obtained by measuring the positions of the protruded large aggregates.

When the value of the grind gauge was less than 100 $\mu$m, the surface coated with the plastisol appeared smooth and the plastisol was shown to be good as the coating material.

When the value was 100 $\mu$m or more, the plastisol was more suitable for using as a molding material by casting or by foaming.

The results of Comparative examples 1 and 2 shown as "1.0 mm screen ON" mean that heterogeneous mixtures containing large aggregates having diameters of 1 mm or larger were formed and the plastisol was not successfully prepared.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, in the method of preparation of vinyl chloride resin plastisol of the invention, the strong mixing generally required for mixing the resin and the plasticizer as the main components is not necessary. It is sufficient that the vinyl chloride resin particles are immersed in the plasticizer during mild stirring. A finely dispersed plastisol can be obtained even by charging the resin particles into a tank containing the plasticizer and leaving the mixture standing. A mixing apparatus, such as a grinding mixer, a Henshel mixer or a biaxial mixer, is therefore not necessary. An apparatus comprising a tank alone or a tank and a simple stirrer used for immersion of the resin particles in the plasticizer is sufficient for the operation in place of a strong mixer with shearing action. Thus, the industrial advantage of the method of invention is remarkable.

What is claimed is:

1. In a method for the preparation of a plastisol of vinyl chloride resin particles in a plasticizer which includes the step of immersing aggregates of vinyl chloride resin particles in a plasticizer, the improvement which comprises forming a plastisol during the immersing step which is substantially free of the aggregates by employing, in 30 to 250 weight parts of the plasticizer, 100 weight parts of aggregates of vinyl chloride resin particles prepared by drying an aqueous dispersion of vinyl chloride resin particles in a spray drying apparatus to form aggregates of the vinyl chloride resins particles having an average diameter in the range from 80 to 700 $\mu$m, whereby a plastisol of the particles is formed without the necessity of a shearing action mixing step to segregate the aggregates into individual vinyl chloride resin particles in the plastisol.

2. A method of preparation of vinyl chloride resin plastisol as claimed in claim 1 wherein the average diameter of the vinyl chloride resin particles being prepared by drying is from 100 to 300 $\mu$m.

3. A method of preparation of vinyl chloride resin plastisol as claimed in claim 1 wherein the amount of the plasticizer in the vinyl chloride resin plastisol is from 40 to 100 weight parts based on 100 weight parts of the vinyl chloride resin.

4. A method of preparation of vinyl chloride resin plastisol as claimed in claim 1 wherein the amount of the plasticizer in the vinyl chloride resin plastisol is from 50 to 80 weight parts based on 100 weight parts of the vinyl chloride resin.

5. A method of preparation of vinyl chloride resin plastisol as claimed in claim 1 wherein the dispersion by immersing of the vinyl chloride resin particles in the plasticizer is performed in a tank of a tank lorry.

6. A method for the preparation of a plastisol of vinyl chloride resin particles which is substantially free of aggregates of the particles which comprises the steps of (a) forming aggregates comprising an organic liquid and particles of a vinyl chloride resin by adding 0.5 to 15 weight parts of an organic liquid which is barely soluble in water and does not dissolve or swell the vinyl chloride resin to an aqueous dispersion of the vinyl chloride resin particles containing 100 weights parts of the vinyl chloride resin, separating the water phase from the thus-produced aggregates, drying the separated aggregates at a temperature of 70° C. or below to produce dried aggregates comprising the organic liquid and the vinyl chloride resin particles and (b) dispersing the organic liquid-containing aggregates in a plasticizer as discrete particles of the vinyl chloride resin by merely immersing the aggregates in an amount of the plasticizer which provides 100 weight parts of the vinyl chloride resin in 30 to 250 weight parts of the plasticizer.

7. A method of preparation of vinyl chloride resin plastisol as claimed in claim 6 wherein the amount of the organic fluid is 3 to 10 weight parts based on 100 weight parts of the resin in the aqueous dispersion.

8. A method of preparation of vinyl chloride resin plastisol as claimed in claim 6 wherein the organic fluid is mixed with the aqueous dispersion of the resin at the temperature in the range from 20° to 70° C.

9. A method of preparation of vinyl chloride resin plastisol as claimed in claim 6 wherein the organic fluid is mixed with the aqueous dispersion of the resin at the temperature in the range from 20° to 50° C.

10. A method of preparation of vinyl chloride resin plastisol as claimed in claim 6 wherein the drying temperature is 50° C. or lower.

11. A method of preparation of vinyl choride resin plastisol as claimed in claim 6 wherein the organic fluid is dioctyl phthalate, dinonyl phthalate or dioctyl adipate.

12. A method of preparation of vinyl choride resin plastisol as claimed in claim 6 wherein the dispersion by immersing of the aggregate particles in the plasticizer is performed in a tank of a tank lorry.

13. Aggregates in the form of a dry powder of vinyl chloride resin particles which can be formed into a plastisol of the individual vinyl chloride resin particles which is substantially free of the aggregates without the necessity of shearing action mixing when the aggregates are added to 30 to 250 weight parts per 100 parts of the resin of a plasticizer, which aggregates are produced according to the process of claim 1.

14. Aggregates according to claim 13, wherein the aggregates of the resin particles have an average diameter in the range of 100 to 300 μm.

15. Aggregates in the form of a dry powder of vinyl chloride resin particles which can be formed into a plastisol of the individual vinyl chloride resin particles which is substantially free of the aggregates; without the necessity of shearing action mixing when the aggregates are added to 30 to 250 weight parts per 100 parts of the resin of a plasticizer, which aggregates have an average diameter in the range from 80 to 700 μm and the vinyl chloride resin particles therein are bound to each other by a layer between the particles of 0.5 to 15 weight parts per 100 parts of the vinyl chloride resin of an at most barely water soluble organic liquid having a melting point of 20° C. or lower and atmospheric pressure boiling point of 200° C. or higher which does not dissolve or swell the vinyl chloride resin particles.

16. Aggregates according to claim 13, wherein the organic liquid is dioctyl phthalate, dinonyl phthalate or dioctyl adipate.

17. Aggregates according to claim 15, containing 3 to 10 weight parts of the organic liquid per 100 parts of the resin.

18. Aggregates according to claim 15, wherein the organic liquid is 3 to 10 weight parts of dioctyl phthalate, dinonyl phthalate or dioctyl adipate per 100 parts of the resin and wherein the aggregates have an average diameter in the range of 100 to 300 μm.

19. A method for the preparation of aggregates of vinyl chloride resin particles which form a plastisol which is substantially free of the aggregates merely by immersing, in 30 to 250 weight parts of a plasticizer, 100 weight parts of the aggregates, which comprises drying an aqueous dispersion of vinyl chloride resin particles in a spray drying apparatus at a temperature of 70° C. or below to form aggregates of the vinyl chloride resin particles having an average diameter in the range from 80 to 700 μm.

20. A method for the preparation of aggregates of vinyl chloride resin particles which can be converted to a plastisol of the particles which is substantially free of the aggregates merely by immersing the aggregates in an amount of the plasticizer, which provides 100 weight parts of the vinyl chloride resin in 30 to 250 weight parts of the plasticizer which comprises the steps of adding 0.5 to 15 weight parts of an organic liquid which is barely soluble in water and does not dissolve or swell the vinyl chloride resin particles to an aqueous dispersion of the vinyl chloride resin particles containing 100 weight parts of the vinyl chloride resin; separating the water phase from the thus-produced aggregates; and drying the separated aggregates at a temperature of 70° C. or below to produce dried aggregates comprising the organic liquid and the vinyl chloride resin particles.

* * * * *

UNITED STATES PATENT AND TRADEMARK OFFICE
CERTIFICATE OF CORRECTION

PATENT NO. : 5,231,125

DATED : July 27, 1993

INVENTOR(S) : Kouitu KITAZAWA et al.

It is certified that error appears in the above-identified patent and that said Letters Patent is hereby corrected as shown below:

On the title page, item (30):

Under Foreign Priority Data:

Add - - 252159   August 27, 1992 - -

Signed and Sealed this

Seventh Day of June, 1994

*Attest:*

BRUCE LEHMAN

*Attesting Officer*   Commissioner of Patents and Trademarks